United States Patent [19]

Subrizi et al.

[11] 4,027,290
[45] May 31, 1977

[54] PERIPHERALS INTERRUPT CONTROL UNIT

[75] Inventors: Angelo Subrizi; Ettore Violino, both of Ivrea (Turin), Italy

[73] Assignee: Ing. C. Olivetti & C., S.p.A., Ivrea (Turin), Italy

[22] Filed: June 7, 1974

[21] Appl. No.: 477,467

[30] Foreign Application Priority Data

June 12, 1973  Italy ................. 25092/73

[52] U.S. Cl. ............................ 340/172.5
[51] Int. Cl.² ............ G06F 3/04; G06F 9/18
[58] Field of Search ........... 445/1; 340/172.5

[56] References Cited

UNITED STATES PATENTS

| 815,105 | 6/1974 | Adkins et al. | 340/172.5 |
| 825,902 | 7/1974 | Brown et al. | 340/172.5 |
| 832,692 | 8/1974 | Henzel et al. | 340/172.5 |
| 836,889 | 9/1974 | Kotok et al. | 340/172.5 |
| 863,225 | 1/1975 | Preiss | 340/172.5 |
| 866,181 | 2/1975 | Gayman et al. | 340/172.5 |
| 3,421,150 | 1/1969 | Quosig et al. | 340/172.5 |
| 3,447,135 | 5/1969 | Calta et al. | 340/172.5 |
| 3,641,505 | 2/1972 | Artz et al. | 340/172.5 |
| 3,643,229 | 2/1972 | Stuebe et al. | 340/172.5 |
| 3,665,404 | 5/1972 | Werner | 340/172.5 |
| 3,702,462 | 11/1972 | England | 340/172.5 |
| 3,771,137 | 11/1973 | Barner et al. | 340/172.5 |
| 3,778,780 | 11/1973 | Moore | 340/172.5 |
| 3,815,099 | 6/1974 | Cohen et al. | 340/172.5 |
| 3,886,524 | 5/1975 | Appelt | 340/172.5 |
| 3,889,237 | 6/1975 | Alferness et al. | 340/172.5 |

Primary Examiner—Gareth D. Shaw
Assistant Examiner—Jan E. Rhoads
Attorney, Agent, or Firm—Schuyler, Birch, Swindler, McKie & Beckett

[57] ABSTRACT

A multiple control unit for selectively connecting a plurality of peripheral units to a central processor comprising a register for storing the interruptions coming from the peripherals; a disabling circuit for disabling the cell storing the interruption executed by the central processor in response to an end-of-processing signal generated from the CPU.

2 Claims, 4 Drawing Figures

PERIPHERALS INTERRUPT CONTROL UNIT

BACKGROUND OF THE INVENTION

1. Field of the Invention

The present invention refers to a multiple control unit for selectively connecting a plurality of peripheral units with a central processing unit, comprising a register for memorizing in corresponding cells a plurality of interruption signals generated by said peripheral units for interrupting said processing operations, a priority decoder connected with said register for arranging said interruption signals according to a priority order and for generating a predetermined code combination associated with a priority interruption signal, and a device for transmitting said predetermined code combination to said central unit.

2. Description of the Prior Art

It is known to connect a plurality of peripheral units with a central processing unit by means of corresponding control units adapted to handle the data flow between central and peripheral units.

But this solution is of no use for machines where dimensions and cost are more critical than the processing speed.

It is furthermore known to connect a plurality of peripheral units with a central unit by means of a single multiple control unit adapted to establish a priority order among the peripherals.

A known multiple control unit of such kind comprises a register for storing the interruptions and a delay circuit to prevent the interruption of lower priority from being stored in such register during a fixed time interval, until the processing operation related to the interruptions of higher priority are exhausted.

But such a control unit has the disadvantage of slow operation in handling the interruptions as the register inhibition duration must be at least equal to the time required to handle any interruption, whereby such a time is longer or equal to the time required to execute the processing operation of the maxima duration.

A multiple control unit is known wherein a register adapted to store the interruptions is sensed cyclically by a timer. An interruption is handled as soon as it is recognized by the timer; after this the timer continues to sense the register starting from the position subsequent to the one corresponding to the interruption handled.

But such a control unit has the disadvantage that an instruction of higher priority appearing after the timer has sensed the register position corresponding thereto, is recognized only when the timer has completed the sensing cycle.

Furthermore, both described control units have the disadvantage that the reset of the cells storing the interruptions is made in a specific manner by wires associated with the respective interruption causes. Consequently, the central unit is charged with a task of selecting the wire associated with the handled interruption.

SUMMARY OF THE INVENTION

These and other disadvantages are obviated by the multiple control unit in accordance with the invention which is characterized by a disabling circuit conditioned by an end signal generated by said central unit at the end of the processing operation associated with said priority signal, and by said predetermined code combination for erasing said priority signal in the corresponding cell of said register whereby said register stores said interruption signals without having to store priority information.

BRIEF DESCRIPTION OF THE DRAWINGS

A preferred embodiment of the invention is represented by the following description made by way of example and not in a limiting sense with reference to the accompanying drawings wherein.

DETAILED DESCRIPTION OF THE INVENTION

Figure 1:
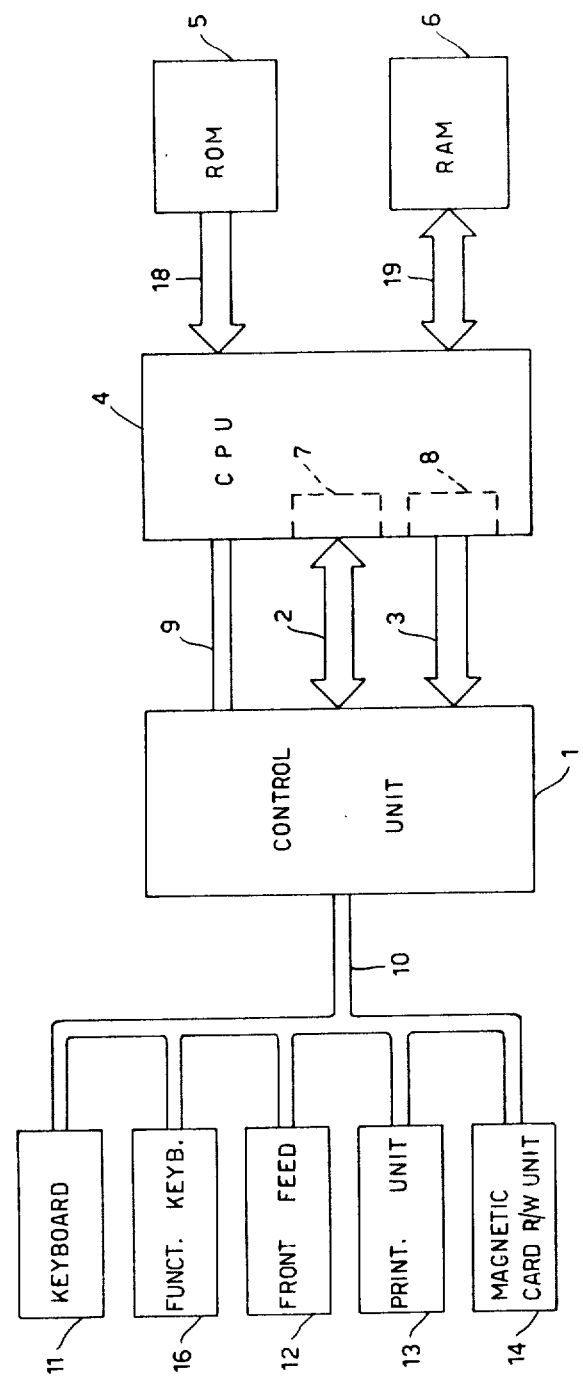
FIG. 1 is the block diagram of a machine using a control unit according to the invention.
Figure 2:
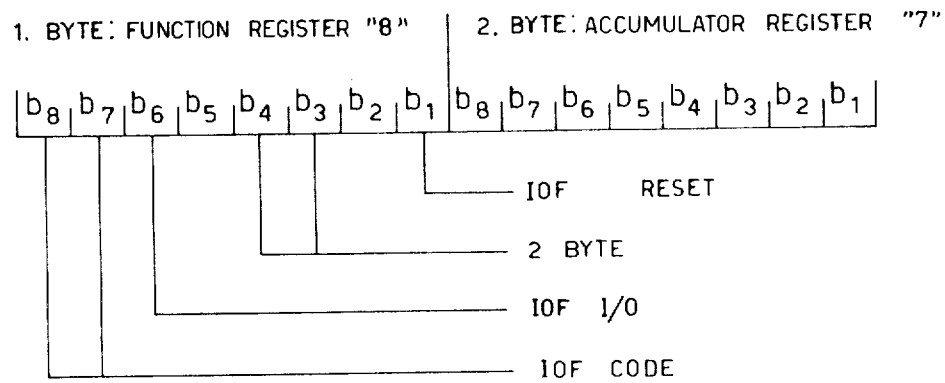
FIG. 2 is the format of the microinstruction IOF used by the control unit according to the invention.

The multiple control unit 1 (FIG. 1) according to the invention is connected with the central processing unit 4 by means of three channels 2, 3, 9. The central unit 4 may be of any known type and is adapted to process the data received from the multiple control unit 1 by means of the execution of "microinstructions" which are permanently stored on a storage 5, hereinafter identified by the symbol ROM, by means of a channel 18. The ROM 5 is of the read only type, namely the user is not capable of modifying its contents. The ROM 5 contains the amount of microinstructions adapted to execute all operations required by the operator. A sequence of microinstructions (microprogram) determined by the central unit 4 in a known manner, corresponds to each operation.

The central unit 4 is connected by a channel 19 with a storage 6, hereinafter identified by the symbol RAM, whereon data may be read and written. The RAM 6 is used as a storage for fixed data or for data which may vary during the processing operation. The connection and the data interchange between the central unit 4, the ROM 5 and the RAM 6 is here not detailed as this is no part of the subject referred to the present invention. For more details reference is made to the description, for instance, to U.S. Pat. No. 3,828,322 issued on Aug. 6, 1974. The central unit 4 is of the type having a plurality of priority levels. More precisely, it has at least two priority levels: a level for executing the processing operations and a level for controlling the conversation with the peripherals.

The multiple control unit 1 is connected by means of a channel 10 with a group of peripheral units which may be, for instance: a keyboard 11, an automatic front feed facility 12, a printing unit 13, a magnetic card reading/writing unit 14, and a function key unit 16.

It is to be noted that the above listed peripheral units are cited by way of example, as also peripheral units of other type may be connected with the multiple control unit 1.

The keyboard 11 is of the known type, for instance of the type specified in U.S. Pat. No. 3,826,882 issued on July 30, 1974.

The eight bit coding according to the ISO code, of the data entered by the keyboard is made in a known manner as described, for instance, in the volume "Pulse, digital and switching waveform" by Millman-Taub issued by McGraw Hill Inc., 1965, on the page 349, FIGS. 9–43. Such data are used by the central unit 4 for processing according to the operator's requirements.

Also the printing unit 13 is of the known type, for instance, as specified in U.S. Pat. No. 3,770,095 and adapted to print out the data recognized from the central unit 4 through the multiple control unit 1.

The front feed facility 12 is of the type as specified in U.S. Pat. No. 3,826,346 issued on July 30, 1974 and adapted to insert and position pressbooks or bank cards with respect to the printing unit 12, in the event the device is assembled on a accounting machine.

The magnetic card reading/writing unit 14 is of the type specified in U.S. Pat. No. 3,828,322 issued on Aug. 6, 1974 and adapted to read and/or record the data on a magnetic card.

Finally, the function key unit has the object of controlling the program execution in a manner that will be described below. The data and command interchange between the central unit 4 and the multiple control unit 1 is carried out by means of a special input-output microinstruction called IOF.

Said microinstruction comprises two words or bytes of eight bit which are recorded during the execution of each IOF in a function register 8 and in an accumulator register 7 of the central unit 4 (FIG. 1).

The recognizing and execution description of the microinstruction IOF by the central unit 4 and the fetch from the ROM 5 to the central unit 4 is not detailed as it is no part of the subject referred to the present invention. It may only be said that incidental to the execution of the microinstruction IOF by the central unit 4, the first and the second byte of the microinstruction IOF are recorded respectively on the registers 8 and 7.

Table A

| IOF | $b_8$ | $b_7$ | $b_6$ | $b_5$ | (Register 8) $b_4$ | $b_3$ | $b_1$ | | Functions executed |
|---|---|---|---|---|---|---|---|---|---|
| FU00 | 0 | 1 | 0 | | 0 | 0 | | | character output |
| FU01 | 0 | 1 | 0 | | 0 | 1 | | | command output |
| FU02 | 0 | 1 | 0 | | 1 | 0 | | | selection output |
| FU04 | 0 | 1 | 1 | | 0 | 0 | | Reset | character input |
| FU05 | 0 | 1 | 1 | | 0 | 1 | | | status input |
| FU06 | 0 | 1 | 1 | | 1 | 0 | | | name input |

More particularly, the bits $b_7$ and $b_8$ (Table A) of the first byte of the microinstruction, identify the IOF among the possible microinstructions; the bit $b_6 = 0$ denotes that the data interchange occurs from the central unit 4 to a peripheral unit (output IOF), or viceversa $b_6 = 1$ (input IOF); the bits $b_3$ and $b_4$ denote whether the information specified by the 2nd byte is: a "character", a "command", the "status" of some switches of the peripherals, in the event the central unit selects a peripheral unit, or a "name" of a peripheral unit in the event that there is a peripheral unit that interrupted the operation of the central unit 4.

The selection of a peripheral unit by the central unit 4 occurs by means of the execution of a special output microinstruction IOF, which is characterized by the bit $b_3 = 0$; the bit $b_4 = 1$, the bit $b_6 = 0$, all belonging to the first byte. In this event the meaning of the bits $b_2$ and $b_3$ of the second byte is shown in the Table B.

Table B

| Peripheral unit selection | (Register 7) $b_2$ | $b_3$ | $b_4$ |
|---|---|---|---|
| Printing | 0 | 0 | 1 |
| Automatic front feed facility | 1 | 0 | 1 |
| Magnetic card | 0 | 1 | 1 |

The result of the selection IOF is the connection of the central unit with the peripheral unit selected by the second byte.

In the event of an interruption determined by a peripheral unit, the central unit executes a special microinstruction for recognizing the interrupting peripheral unit. Such IOF is called name INPUT and has the bits $b_3 = 0$, $b_4 = 1$, $b_6 = 1$. In such event the bits $b_2$, $b_3$, $b_4$ and $b_5$ of the second byte identify a code combination corresponding to the type of the interruption cause as specified in the Table C.

Table C

| Interruption cause | (Register 7) Interruption | $b_2$ | $b_3$ | $b_4$ | $b_5$ |
|---|---|---|---|---|---|
| Clear | 71 | 1 | 1 | 1 | 0 |
| Error | 72 | 0 | 1 | 1 | 0 |
| Character ready | 73 | 1 | 0 | 1 | 0 |
| Sproket | 74 | 0 | 0 | 1 | 0 |
| Cycle start | 75 | 1 | 1 | 0 | 0 |
| Card expulsion | 76 | 0 | 1 | 0 | 0 |
| Line Feed strobe | 77 | 1 | 0 | 0 | 0 |
| End of card expulsion | 78 | 0 | 0 | 0 | 0 |
| End of card Line Feed | 79 | 0 | 0 | 0 | 1 |
| Card clock | 80 | 1 | 0 | 0 | 1 |

The interruption causes listed in this table are cited by way of example only, as their meaning may be varied according to the machine type which correspond to different types of peripheral units.

Figure 3:
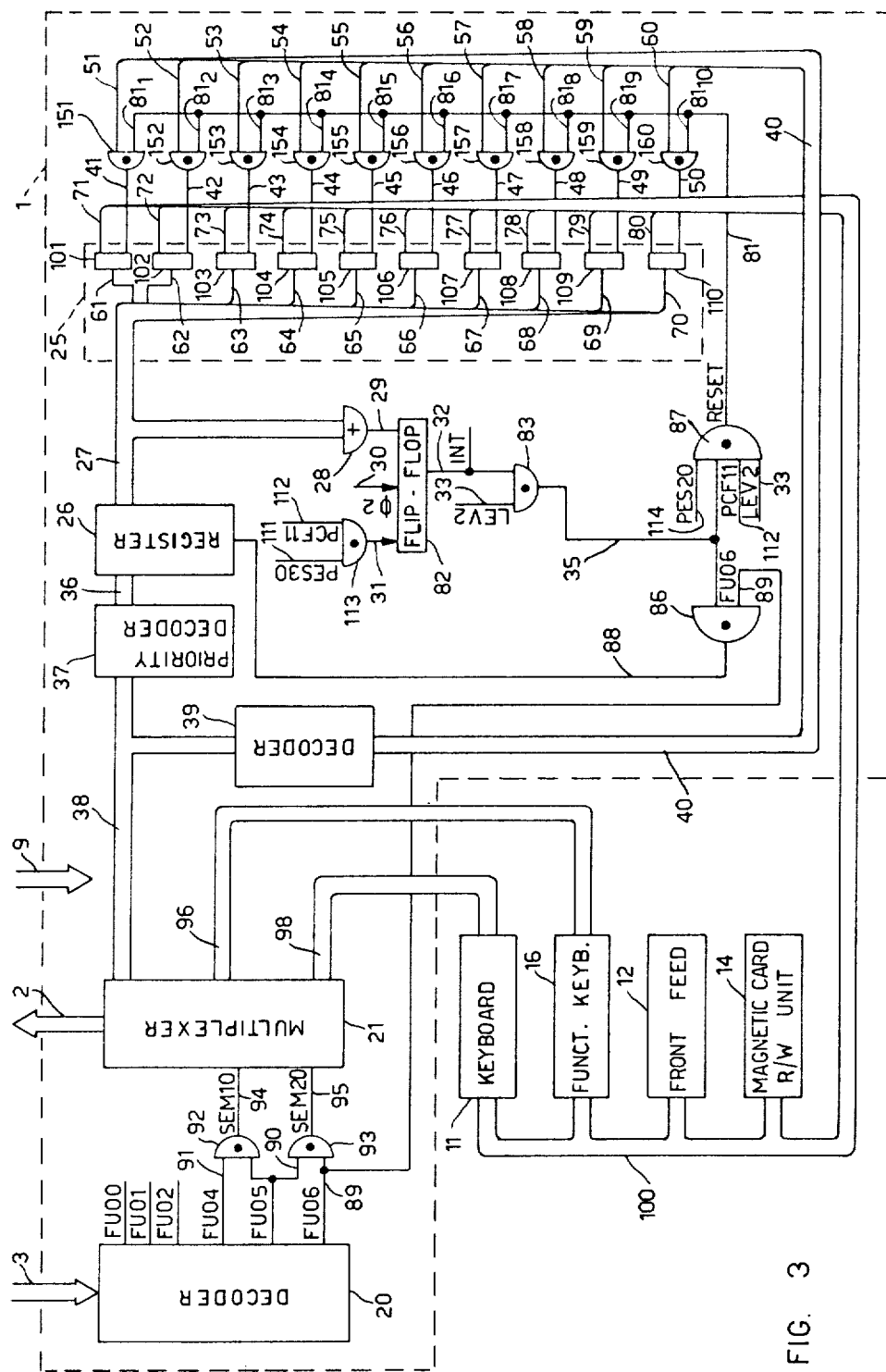
FIG. 3 is the diagram of the control unit according to the invention.

Here below is given a particular description, with reference to the FIG. 3, of the part of the control unit 1 related to the instructions received from the peripherals.

The peripheral units 11, 12, 14 and 16 are connected with the enabling inputs of a flip-flop group 101-110 of an interruption register 25, by means of a channel 100 which includes the wires 71-80.

The register 25 memorizes the interruptions by generating the signals on the wires 61-70 corresponding to the peripherals having requested the interruption.

For instance, if the keyboard 11 generates a "character ready" signal on the wire 73, there is energized the flip-flop 103.

The outputs 61-70 are connected by means of a channel 27 with a staticizing register 26 adapted to staticize the interruptions. Such staticizing operation is enabled by a wire 88 carrying a control signal which is generated in a way that will be described below.

The register 26 is connected by the medium of a bus 36, with a decoder 37 the output whereof supplies a four-bit code combination related to the name of the interrupting cause according to the priority ordered as established by the Table C.

Both the interruption cause and the priority order thereof listed on Table C are shown by way of example only; any other order and any other interruption cause might be set up according to the the requirements of the machine whereon the multiple control unit 1 is assembled. The priority decoder 37 may be of any known type, for instance it may be consist of a combination network having ten inputs and four outputs adapted to generate the logic function capable of ordering the interruption causes applied to the inputs according to an established priority array.

The decoder 37 is connected, by means of a channel 38, with a multiplexer 21, the inputs of which are also accessed by the keyboard 11 through a channel 98, and the status keys 16 through a channel 96.

The multiplexer 21 has the function to selectively connect one of the cited peripheral units with the channel 2 which is connected with the accumulator register 7 of the central unit 4 (FIG. 1).

The selection of which of the cited channels 38, 96 and 98 should be connected with the central unit 4 through the channel 2, is carried out by the multiplexer 21 based upon the code combinations of the signals SEM 10 and SEM 20, which are respectively applied to the two wires 94 and 95 according to the following Table D.

Table D

| SEM 10 | SEM 20 | Peripheral unit connected |
|--------|--------|---------------------------|
| 1      | 0      | Keyboard                  |
| 0      | 1      | Channel 38                |
| 1      | 1      | Status keys               |

The signals SEM 10 and SEM 20 are generated respectively by the two OR - circuits 92 and 93. Such circuits are connected with the outputs 91, 90, 89 of the decoder 20 carrying the signals FU04, FU05, FU06.

The decoder 20 is connected with the channel 3 originating from the function register 8 of the central unit 4. The decoder is adapted to selectively generate the signals FU00, FU01, FU02, FU04, FU05, FU06 as a result of the code combination related to the first byte of the microinstruction IOF, according to the contents of the Table A.

When a character input microinstruction is decoded, the signal FU04 is at level ONE whereby the signals SEM 10 and SEM 20 are at the levels 1 and 0; in such a way the multiplexer 21 connects the keyboard 11 with the channel 2 for enabling the transmission of the character set up to the control unit. Similarly, the signals FU05 and FU06 connect the status keys 16 and the channel 38, with the channel 2.

The signal FU06 carried by the output wire 89 of the decoder 20 is applied to one input of the AND 86, the other input consisting of the wire 35. The AND 86 generates a signal on the wire 88 which, as seen above, controls the register 26 so as to staticize the interruptions.

As the multiplexer 21 and the function decoder 20 are of a known type they are not detailed.

The output channel 27 of the register 25 is connected, besides with the register 26, also with an OR-circuit 28 the output of which is connected with the energizing wire 29 of a flip-flop 82. The enabling of the flip-flop 82 if conditioned by a clock signal $\phi 2$ which is cyclically generated over the wire 30 of the channel 9.

Conversely, the flip-flop 82 disabling wire 31 is the output of an AND-circuit 113 the inputs which consist of a wire 112 carrying a signal PCF11, and a wire 111 carrying a signal PES30.

The signal PCF11 comes from a wire 112 of the channel 3, which wire carries the bit $b_1$ of the first microinstruction byte. As shown on Table A, the bit $b_1$ defines the interruption reset microinstruction IOF.

Figure 4:
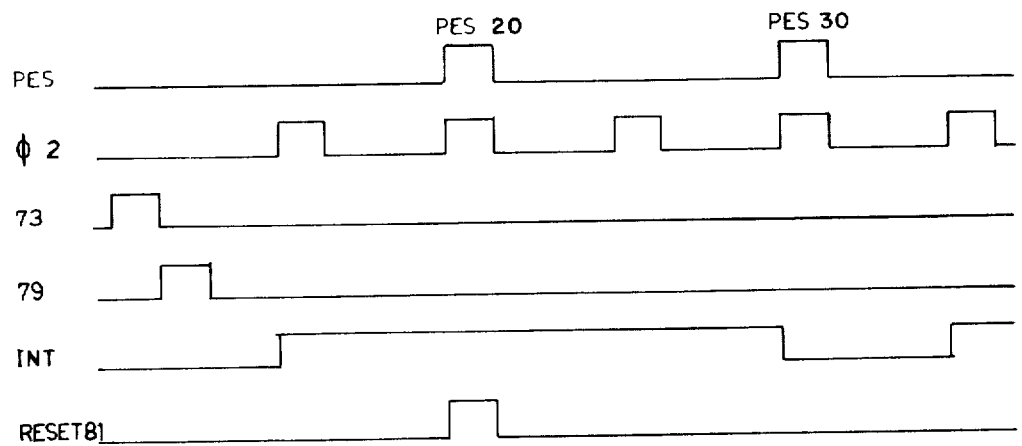
FIG. 4 is the timing diagram.

Conversely, the signal PES30 is cyclically generated by the central unit 4 during the execution of each microinstruction (FIG. 4). The output 32 of the flip-flop 82 generates a signal INT which is transmitted to the central unit 4 by means of the channel 9 and is used for communicating the existing interruptions.

The output 32 is connected with an input of an AND 83, the other input 33 carrying a signal LEV2 generated by the central unit 4 when the latter operates at a priority level "2".

The AND 83 output consists of the wire 35 which, as seen above, abuts upon the input of the AND 86. Such wire 35 is furthermore connected with the AND 87, the other inputs being the wire 33, the wire 112 and a wire 114 which carries the timing signal PES20 (FIG. 4).

The output 81 of the AND 87 is connected with the input wires $81_1, \ldots 81_{10}$ of as many AND-circuits 151-160. The inputs 51-60 of the ANDs 151-160 are connected with an output channel 40 of a decoder 39 adapted to decode the four output bits of the priority decoder 37 and carried by the channel 38, and to generate a corresponding ten bit code combination.

The decoding operation is carried out so that always one and only one of the outputs 51-60 is energized and this is the one corresponding to the interruption cause carried by the channel 38. The outputs 41-50 of the ANDs 151-160 are connected with the disabling wires of the flip-flops 101-110.

There is now described the operation of the multiple control unit 1 according to the invention.

It is now assumed that two interruption signals are originated from peripheral units, for instance, from the keyboard 11 and from the front feed facility 12.

In fact, when the operator depresses a key, the keyboard 11 sends out a "character ready" signal represented by a level "1" of the wire 73 of the channel 100 (FIG. 3), and transmits the code combinations of the lowered key to the multiplexer 21 through the channel 98. At the same time it is assumed that the front feed facility 12 sends out an "end of card insertion" signal over the wire 79 of the channel 100. Such signal is generated by a microswitch, not shown in the figure, when the card is correctly inserted in the front feed facility 12.

Such signals are stored on the interruption register 25 energizing respectively the flip-flops 103 and 109.

In this way a code combination 0010000010 is obtained over the wires 61-70. The so obtained code combination is sent to the register 26 and to the OR 28 through the channel 27.

The signal applied to the output wire 29 of the OR 28 energizes the flip-flop 82. The clock signal $\phi 2$ originated from the central unit 4 on the wire 30 of the channel 9 sets the flip-flop 82.

The signal INT on the wire 32 is the interrupting one and is sent to the central unit 4 over the channel 9. This signal, as said above, conditions the central unit to shift from the priority level whereat are executed the computing microinstructions, to the level of higher priority whereat are executed the microprograms handling the peripherals. As a result, the central unit 4 applies a signal LEV2 on the wire 33, through the channel 9, which signal denotes the activation of the higher priority level and, concurrently, it executes a name input microinstruction IOF. The purpose is to enable the channel 2 so as to write the name of the interruption peripheral unit on the register 7 of the central unit 4 and to insert the code combination of the microinstruction IOF itself on the decoder 20.

The level two signal LEV2 on the wire 33 together with the INT interruption signal on the wire 32, energize the AND 83 which activates the wire 35. At the same time, the first byte of the name input microinstruction IOF on the channel 3 is decoded by the function decoder 20 thus generating the signal FU06 on the wire 89 which, together with the signal on the wire 35, energizes the AND 86. The latter together with the signal of the wire 35 enables, through the AND 86, the register 26 to staticize the interruption signal on the channel 27.

The 10 outputs of the register 26 are applied, by the channel 36, to the input of the priority decoder 37 which feeds a four-bit code combination on the channel 38, corresponding to the name of the peripheral unit having higher priority among those having interrupted, in accordance with what shown on Table C.

In our example the peripheral unit of higher priority is the keyboard 11 which has generated the character ready signal. This signal is of higher priority than the signal originated in the front feed facility 12 and, therefore, the code combination generated by the priority decoder 37 on the channel 38 will be $b_2=1$, $b_3=0$, $b_4=1$, $b_5=0$ as shown on Table C. Such code combination is fed into the multiplexer 21, which is enabled by the signals on the wires 94 and 95, and sent to the central unit 4 through the channel 2.

The signals on the wires 95 and 94 are generated by the ANDs 93 and 92 according to the level of the signals on the outputs 89, 90, 91 of the decoder 20 as a result of the recognizing of a name output microinstruction IOF.

The name of the peripheral unit carried by the channel 2 is stored in the accumulator 7 of the central unit 4 for retrieving a microprogram from the ROM 5 suitable to handle the character ready request operation.

During the execution of the keyboard 11 handling microprogram, the central unit 4 must necessarily execute a character INPUT microinstruction for accepting the character originated in the keyboard 11.

The central unit thus sends the first byte of the character input microinstruction IOF over the channel 3. Said byte is decoded by the decoder 20 which feeds a signal FU04 on the output 91 being as the one of the Table A. Such signal FU04 generates, by means of the AND 92, a variation of the code combination existent on the wires 94 and 95, whereby the multiplexer 21 is enabled to connect the channel 98 coming from the keyboard 11 and whereon is present the character from the keyboard, with the channel 2.

The code being present on the channel 2 is therefore stored in the accumulator 7 of the central unit 4. When the character is accepted by the central unit by the medium of the sequence of microinstructions not described, the central unit 4 carries out a generic microinstruction IOF, having the bit $b_1=1$. This means (Table A) that this microinstruction is the last one of the microprogram associated with the character ready signal.

More generally, it must be said that each interruption cause shown on the Table C, conditions the central unit 4 to execute a corresponding microprogram suitable to handle the interruption cause itself. The handling of each interruption cause obtained by the execution of the associated microprogram always ends with a reset microinstruction IOF characterized by the bit $b_1=1$ which precisely denotes that the interruption cause has been handled by the central unit 4. It is important to note that whatever the interruption cause might be, the end of its handling microprogram is always characterized by a microinstruction IOF having the bit $b_1$ of the first byte equal to 1, whereby the end of the handling operation is in no way bound to the type of the interruption cause.

The bit $b_1$ is picked up directly from the channel 3 on the wire 112, thus generating a signal PCF11 together with the enabling signal on the wire 35, and the level two (LEV2) signal on the wire 33 together with the synchronism signal PES 20 existing on the wire 114 of the channel 9, energize the AND 97 which generates a RESET signal on the wire 81. As recited above, such wire is connected with all inputs $81_1 \ldots 81_{10}$ of the ANDs 151–160. As all other inputs 51–60 of the ANDs 151–160 are at level "0" except the input 53, corresponding to the interruption of the "keyboard character ready" signal, only the disabling wire 43 of the flip-flop 103 is at level 1. Consequently, the contents of the register 25 become 0000000100. The flip-flop 109 corresponding to the "end of card introduction" interruption is not disabled as the wire 59 carries no signal, because the decoder 39 feeds the signal only on the wire 83 corresponding to the interruption having higher priority selected by the priority decoder 37.

The signal PCF11 on the wire 112 along with the timing one PES30 on the wire 111 originating from the central unit 4 through the channel 9, energizes the AND 113 which applies a signal on the wire 31, which resets the flip-flop 82 thus reset the interruption INT signal.

But this action does not condition the central unit to activate the level three. At the next subsequent clock $\phi 2$ applied on the wire 30, the interruption signal of the front feed facility being applied to the wire 69, newly energizes the flip-flop 82 whereby the signal INT of the wire 32 is newly set. As seen above, said signal conditions the central unit 4 to execute the microprogram relative to the interruption associated with the lead 79, as it is the only one existent on the register 25 and, therefore, the one having higher priority.

If during the execution cycle of such microprogram one or more interruptions are generated, these are memorized on the register 25 by the energization of the corresponding flip-flops 61–70 and are later handled as a sequence by the central unit 4 according to the succession established by the control unit 1 (see Table C).

The timing of the signals $\phi 2$, PES20, PES30, INT, RESET on the wires 73 and 79 is clearly detailed in FIG. 4.

Therefore, it becomes apparent in what way the central unit 4 does not perform any operation adapted to handle the interruption sequence according to a priority order, and in what way the end signal PCF11 generated at the end of the handling microprogram of the interruption having higher priority is independent from the interruption handled. In fact, the next subsequent selection of the interruption to be handled is performed automatically by the control unit according to the invention as the cell of the register 25 related to the handled interruption is disabled automatically by the control unit as the end signal PCF11 appears on the wire 112, while the other interruptions are kept energized.

What we claim is:

1. A peripheral interrupt control unit for selectively providing interrupt signals from a plurality of peripheral units to a central processing unit of the type capable of executing a program stored in a memory, said interrupt signals being sent to said central processing unit in an order determined by the priority of the peripheral unit requesting an interrupt, said interrupt control unit comprising:

an interrupt register having a plurality of cells, ecah of said cells storing an associated interrupt request signal generated by one of said peripheral units;

means for storing in said cells and interrupt request signals;

a single priority decoder connected with the output of said interrupt register for selecting one of said interrupt request signals according to a predetermined priority order to be transmitted to said central processing unit and for generating a code combination of signals associated with said selected interrupt request signal;

means for transmitting said code combination of signals to said central processing unit; and clearing means connected between the output of said priority decoder means and said interrupt register and enabled by an end signal generated by said central processing unit, said clearing means including a decoder means responsive to said generated code combination for clearing the cell storing the interrupt request signal selected by said decoder means of said clearing means.

2. A control unit according to claim 1 wherein said cells consist of flip-flop, said interrupt request signals generated by said peripheral units being supplied to the set input of the corresponding flip-flop, said clearing means comprising:

a plurality of AND circuits, each of said AND circuits having an output connected to the reset input of one of said flip-flops and having a first input connected to the corresponding output of said decoder means of said clearing means and a second input enabled by said end signal.

* * * * *